United States Patent [19]

Bordonaro et al.

[11] Patent Number: 5,307,485

[45] Date of Patent: Apr. 26, 1994

[54] METHOD AND APPARATUS FOR MERGING SORTED LISTS IN A MULTIPROCESSOR SHARED MEMORY SYSTEM

[75] Inventors: Frank G. Bordonaro, Kingston; Glen A. Brent, Red Hook; Roger J. Edwards, Woodstock; Joel Goldman, Kingston, all of N.Y.; David B. Lindquist, Raleigh, N.C.; Kushal A. Patel, Lake Katrine, N.Y.; Peyton R. Williams, Jr., Kingston, N.Y.

[73] Assignee: International Business Machines Corporation, Armonk, N.Y.

[21] Appl. No.: 708,610

[22] Filed: May 31, 1991

[51] Int. Cl.$^5$ .................. G06F 7/16; G06F 15/16
[52] U.S. Cl. .................. 395/600; 395/800; 364/DIG. 2; 364/931.41; 364/931.43; 364/931.46; 364/962.2; 364/962.3; 340/146.2
[58] Field of Search .................. 364/DIG. 1, DIG. 2; 395/600, 800; 340/146.2

[56] References Cited

U.S. PATENT DOCUMENTS

| | | | |
|---|---|---|---|
| 4,210,961 | 7/1980 | Whitlow et al. | 395/600 |
| 4,575,798 | 3/1986 | Lindstrom et al. | 395/600 |
| 4,809,158 | 2/1989 | McCauley | 395/600 |
| 5,084,815 | 1/1992 | Mazzario | 395/800 |
| 5,086,408 | 2/1992 | Sakata | 395/600 |
| 5,121,494 | 6/1992 | Dias et al. | 395/600 |
| 5,146,590 | 9/1992 | Lorie et al. | 395/600 |
| 5,179,699 | 1/1993 | Iyer et al. | 395/650 |
| 5,185,888 | 2/1993 | Tanaka et al. | 395/600 |

FOREIGN PATENT DOCUMENTS 0378038 7/1990 European Pat. Off. .

OTHER PUBLICATIONS

IEEE Computer Society Press-Parbase 90-"An Efficient Multiprocessor Merge Algorithm" by B. R. Iyer et al-pp. 276-283, (1990).

Proceedings of the International Conf. in Their Applications Mar. 1990, pp. 276-283, P. Varman et al.

The Computer Journal, vol. 31, No. 6, 1988, pp. 553-556, S. Dvorek et al, "Merging by Decomposition Revisited".

IBM TDB, vol. 33, No. 9, Feb. 1991, pp. 215-217, "Using a Surrogate Median . . . Join Algorithm".

Primary Examiner—Thomas C. Lee
Assistant Examiner—Matthew C. Fagan
Attorney, Agent, or Firm—Lynn L. Augspurger

[57] ABSTRACT

A system and method for merging a plurality of sorted lists using multiple processors having access to a common memory in which N sorted lists which may exceed the capacity of the common memory are merged in a parallel environment. Sorted lists from a storage device are loaded into common memory and are divided into a number of tasks equal to the number of available processors. The records assigned to each task are separately sorted, and used to form a single sorted list. A multiprocessing environment takes advantage of its organization during the creation of the tasks, as well as during the actual sorting of the tasks.

11 Claims, 9 Drawing Sheets

METHOD AND APPARATUS FOR MERGING SORTED LISTS IN A MULTIPROCESSOR SHARED MEMORY SYSTEM

TECHNICAL FIELD

The present invention is a system and method for merging a plurality of sorted lists in parallel. More specifically, the present invention relates to a system and method for dividing a plurality of sorted lists into a number of tasks, merging the records in each task on a separate processor in a shared-memory multi-processing environment so that the records are sorted, and concatenating each task to form a single, sorted list.

BACKGROUND ART

Over the past several years, people have sought to solve larger and more complex problems. This has prompted the development of faster and more powerful computers. These more powerful computers include those which utilize a plurality of processors working in conjunction with one another, and are thus called multi-processor computers.

These multi-processor computers can be classed into either tightly-coupled (i.e., shared memory) and loosely-coupled (i.e., unshared memory) computers. As the names imply, shared memory computers are those in which all of the processors share the same memory, whereas in unshared memory computers each processor has its own memory which it does not share with the other processors.

The different types of multi-processor computers are particularly well suited for working with certain types of applications. Unshared memory computers usually work well in applications that allow data to be separated into blocks that reside exclusively in the memories of the individual processors and do not have to be brought together during execution of the application. Transferring data between processors is usually costly in these types of computers, and thus they attempt to limit the communication required for a particular application. Shared memory computers, however, work well with applications that require repeated access to all of the data by all of the processors. The increase in speed which is possible from these multi-processor machines cannot be realized without appropriate, efficient software to take advantage of the parallel architecture. Thus, more efficient software is also a vital part of increasing the speed of problem solving. However, developing applications for a parallel processing environment is quite different and usually more complex from developing applications for the more traditional, single processor computer environments. Yet to utilize a multi-processor computer to its fullest, efficient applications are a necessity.

A key aspect of many large and complex computer applications often involve sorting. Thus, the faster a computer environment can perform sorting, the more quickly a particular problem can be solved. An example of applications which rely heavily on sorting are those involving the manipulation and analysis of large databases. Both hierarchial and relational databases use sorting to organize database records and indices into the databases. As the size of these databases continues to increase in size, the speed of sorting will become an even more significant component in the overall efficiency of an application.

In a typical application, it is advantageous to first create several sorted lists from the records in the database(es) being used. In a multi-processing environment, this can be done by allowing each processor to sort some portion of the database in parallel with the other processors. Even in a single processor environment, however, it is still advantageous to create several sorted lists as a first step toward sorting the entire database. These lists then need to somehow be merged together to form a final, sorted list.

Historically, applications involving large amounts of data have used large, single processor machines to process (e.g., sort and merge) the data due to storage and processing requirements. However, the use of multi-processing has resulted in a new emphasis on parallel applications for sorting and merging which take advantage of these new multi-processing architectures and at the same time provide good performance.

The applications typically take two forms depending upon the type of multi-processing computer used. For an unshared memory computer, the sort phase is easily parallelized by just sorting the data that exists on each processor locally. The merge phase, however, is more difficult because data records that will end up next to each other in the final output list are spread across all of the processors. Determining how the records are to be broken up to form this final output list is a difficult task, and causes unshared memory computers to perform poorly in merge operations.

For a shared memory computer, the data is accessible to all processors equally. The sort phase of the overall sorting process can then be parallelized by assigning roughly equal portions of the records to each of N processors regardless of storage location. Each of these portions is called a task. The end result is N sorted tasks in the shared memory which now must be merged to create a single sorted list. Since these tasks comprise portions of several sorted lists, a task actually comprises a plurality of sorted sub-lists. These sub-lists need to be merged to form a single, sorted task.

One scheme for using a shared memory computer to sort records is described by Iyer et al. in the article "An Efficient Microprocessor Merge Algorithm," (P. J. Varman, B. R. Iyer, D. J. Haderle, PARABASE 90 International Conferences On Database, Parallel Architectures and their Applications, Miami Beach, Fla., March 1990, IEEE Computer Society Press, Cat. No. 90CH2728-4, pp. 276–83). However, Iyer et al. requires an excessive amount of access to the storage device which contains the records when the volume of records is too large to fit into shared memory. Thus, Iyer does not efficiently account for the situation where the database being used is too large to fit into shared memory.

Thus, what is needed is a scheme for using a shared memory computer to sort a plurality of sorted lists and which can efficiently handle a situation where the database is too large for the amount of memory.

DISCLOSURE OF INVENTION

The problems which presently exist in the field of technology discussed above have been alleviated by the present invention. Specifically, the present invention provides a system and method for dividing a plurality of sorted lists into a number of tasks, merging the records in each task on a separate processor in a shared-memory multi-processing environment so that the records are sorted, and concatenating each task to form a single, sorted list.

In general, the present invention relates to a high-speed merging device for merging a plurality of sorted lists each having at least one record, where the merging device is envisioned to comprise a random access memory (RAM), and a plurality of independently operating processors on a multi-processing machine. Of course, computer memories other than RAM could be used as well. The processors are contemplated to share a common random access memory (common memory), and thus the present invention utilizes a shared memory computer.

In order to merge the plurality of sorted lists, partition means are used for selecting a portion of the sorted lists to be merged. The optimal size of the portion selected is related to the capacity of the common memory. Also, pre-order detection means are used to determine whether any sorted list in the selected portion has the property that it is a pre-ordered sorted list. A sorted list is a "pre-ordered" list if each record in any of the sorted lists are either all greater or equal in value to each record in the pre-ordered sorted list or are all less than or equal in value to each record in the pre-ordered sorted list.

Embodiments of the present invention also contemplate the utilization of allocation means for use in dividing the sorted lists within the selected portion into a number of tasks. Some embodiments envision that the number of tasks is to be equal to the number of independently operating processors. The records within a specific task are envisioned to be such that each record in any of the remaining tasks are either all greater or equal in value to each record in the specific task or else all less than or equal in value to each record in the specific task.

Further, embodiments of the present invention contemplate a means for merging the tasks in parallel so that they are sorted, and a means for concatenating the sorted tasks with each other, and with any pre-ordered lists to create a single sorted list. Also, embodiments of the present invention also contemplate means for concatenating the single sorted list with other single sorted lists generated from previously selected portions of the sorted lists to form a final sorted list.

Additional embodiments of the present invention contemplate methods for merging a plurality of sorted lists each having at least one record, where the merging method is envisioned to utilize a random access memory and a plurality of independently operating processors on a multi-processing machine. Further, it should be understood that the embodiments discussed herein can be implemented as both hardware and software embodiments, or a combination thereof.

The foregoing and other objects, features and advantages of the present invention will be apparent from the following more particular description of preferred embodiments of the invention, as illustrated in the accompanying drawings.

BRIEF DESCRIPTION OF THE DRAWINGS

Various objects, features, and attendant advantages of the present invention can be more fully appreciated as the same become better understood with reference to the following detailed description of the present invention when considered in connection with the accompanying drawings, in which.

BEST MODE FOR CARRYING OUT THE INVENTION

I. OVERVIEW

The present invention is a system and method for merging a plurality of sorted lists in parallel. More specifically, the present invention relates to a system and method for dividing a plurality of sorted lists into a number of tasks, merging the records in each task on a separate processor in a shared-memory multi-processing environment so that the records are sorted, and concatenating each task to form a single, sorted list.

Figure 1:
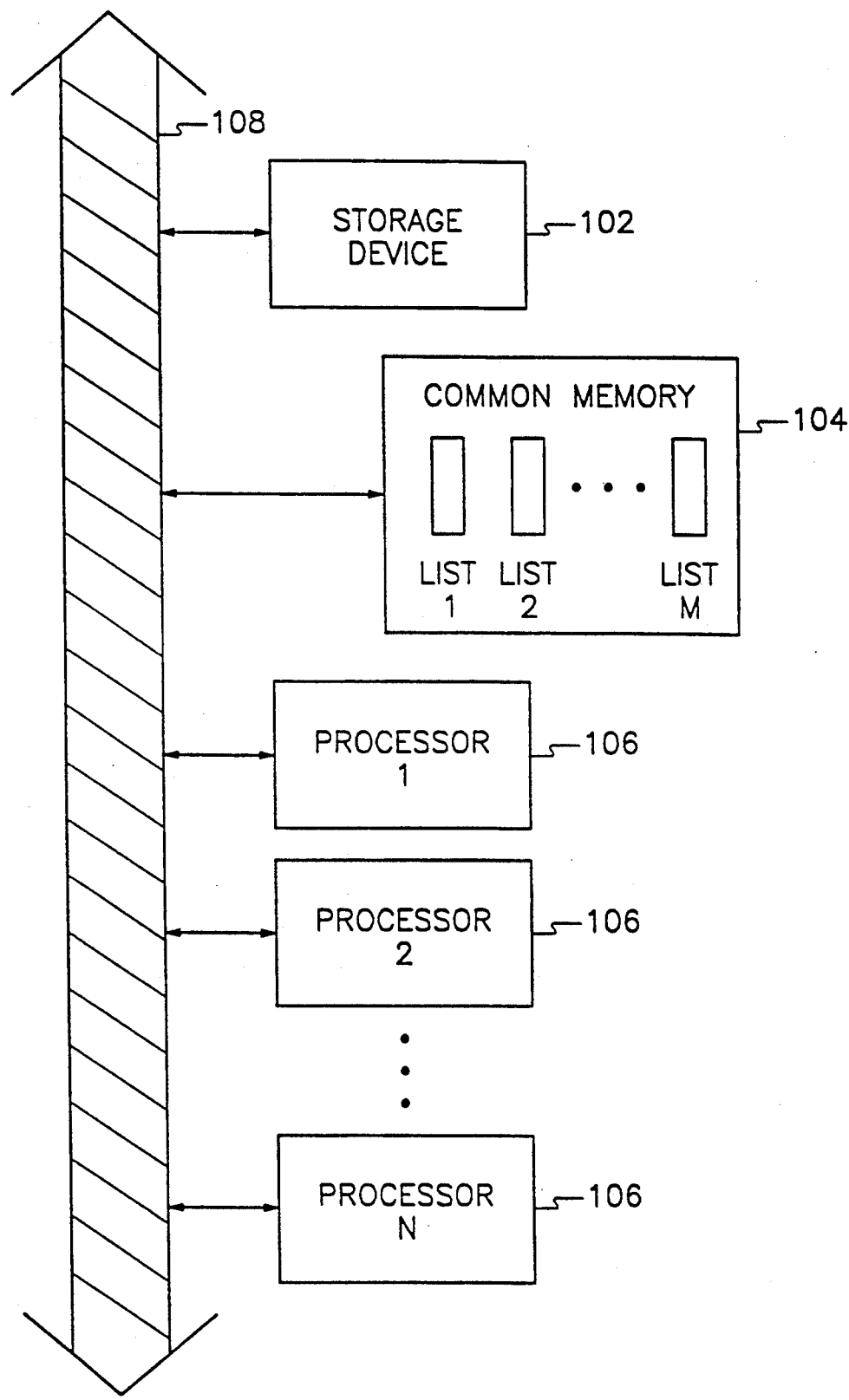
FIG. 1 is a high-level diagram of the environment and components of the present invention.

Embodiments of the present invention can be better explained with regard to the high-level drawing shown by FIG. 1. Referring now to FIG. 1, a bus 108 is shown, connecting a storage device 102, a common memory 104 and N processors 106. In general, the common memory 104 receives M sorted lists from the storage device 102. These M lists are then divided into N tasks, each of which is given to one of the processors 106 to be sorted. These tasks are divided in such a way that after each task is sorted, they can be concatenated into a single, final sorted list (that is, the records of a specific task are such that each record in any of the other tasks are either all greater or equal in value to each record in the specific task or all less than or equal in value to each record in the specific task). In this way, the M lists are "merged" together.

Embodiments of the present invention contemplate that the common memory 104 also contains modules (not shown) which are used in the merge process by the N processors 106. Some of these modules are contemplated to be re-entrant. In addition, some embodiments of the present invention envision that the embodiment shown by FIG. 1 utilizes an ES/9000 series computer from IBM Corporation. However, it should be understood that other computers could be used as well.

Figure 2:
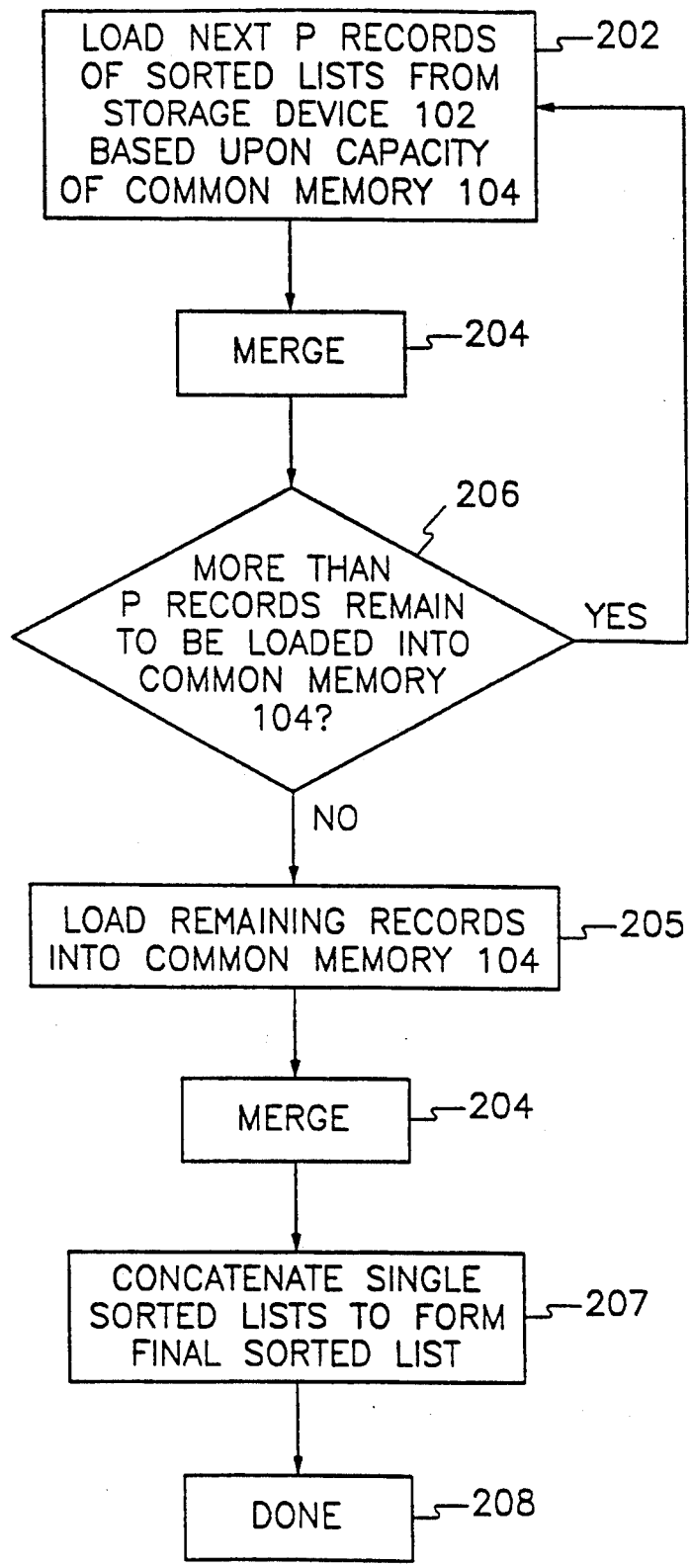
FIG. 2 is a high-level diagram of embodiments contemplated by the present invention.

In addition to having the ability to merge M lists residing in a common memory to create a final sorted list, embodiments of the present invention also contemplate having the ability to manage situations where the number of records in the M sorted lists are greater than the memory capacity of the common memory 104. These embodiments are best explained with regard to FIG. 2. Referring to FIG. 2, the first action taken by these embodiments of the present invention is to load the P records of the sorted lists from the storage device 102 into common memory 104 (thereby forming a selected portion of the sorted lists). The exact number of records to be loaded will be based upon the capacity of the common memory 104. This is indicated by a block 202. Embodiments of the present invention contemplate that the same number of records are loaded from each of the sorted lists within the storage device 102 (for as long as each sorted list has records be to loaded). One the next P records have been loaded as indicated above, the sorted lists are then merged, as indicated by a block 204. As previously discussed, this creates a final, sorted list. Embodiments of the present invention contemplate that the sorted lists are merged together in a way that accounts for the fact that the sorted lists may not all be able to fit into common memory 104 at once. This is discussed further below.

The next step is to determine if there are more than P records which remain to be loaded into common memory 104. In other words, do more records need to be loaded than can all fit into common memory 104. If true, then the next P records will be loaded into common memory 104 as indicated by a decision block 206 and block 202. If less than P records remain, then whatever number of remaining records are loaded into common memory 104 as indicated by a block 205. These remaining records are then merged, as indicated by a block 204.

Embodiments of the present invention then contemplate that the single sorted lists which are created as a result of each of the merges are themselves concatenated together into a final sorted list, as indicated by a block 207. However, other embodiments envision that each of the single sorted lists is merely sent to some output device or a storage device, and not actually concatenated together. In any event, the process finally terminates, as indicated by a block 208.

A more detailed discussion of merging the sorted lists as contemplated by embodiments of the present invention is set forth below.

II. MERGING MECHANISM (HIGH-LEVEL)

A high-level description of the merging of the sorted lists as contemplated by embodiments of the present invention will now be described with regard to FIG. 3. It should be noted that the merge discussed with regard to FIG. 3 assumes that at most P records have been read into common memory 104 (as per blocks 202 and 204 of FIG. 2), and thus at most only those records in the common memory 104 are merged at any one time.

Figure 3:
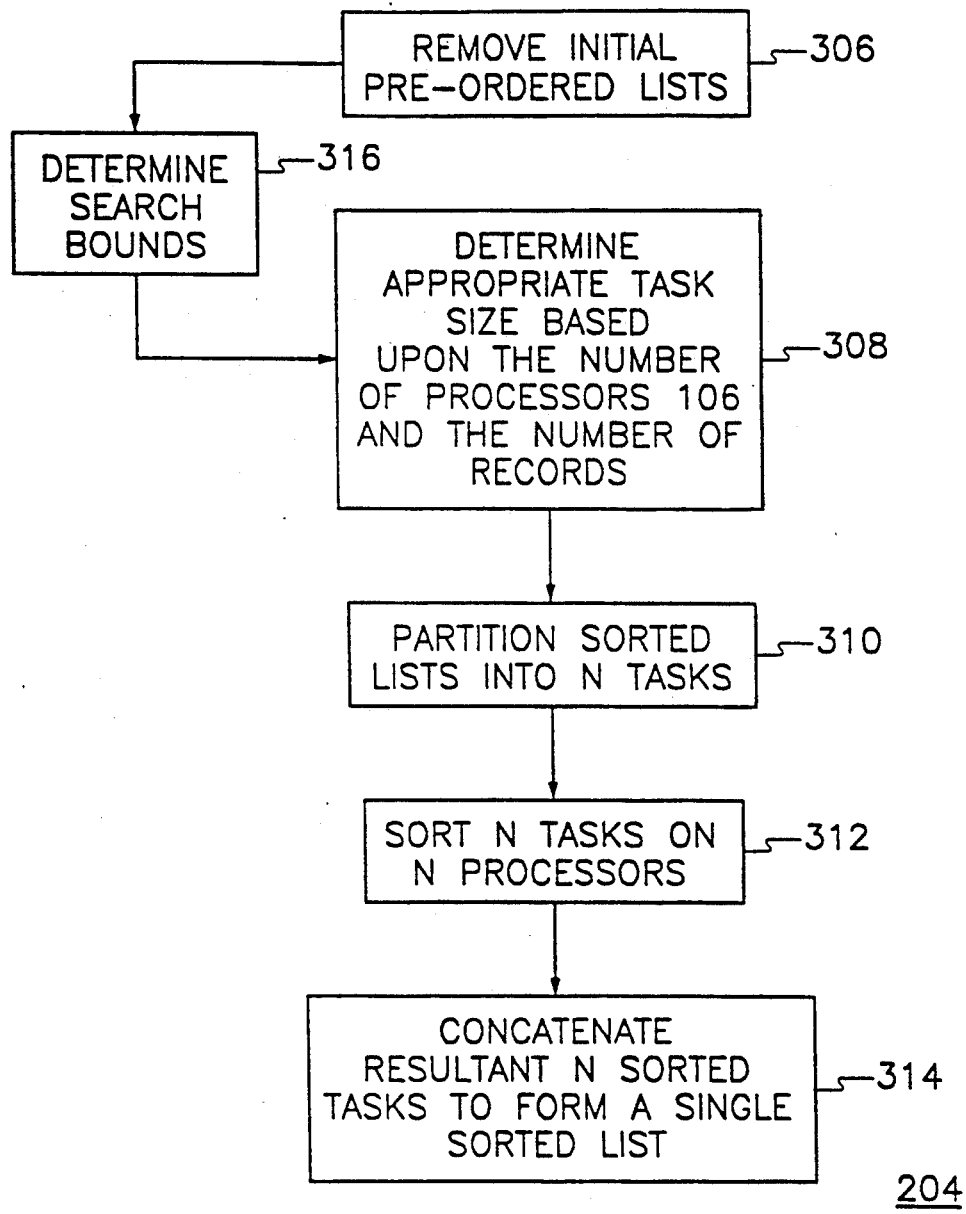
FIG. 3 is a diagram of the merge mechanism as contemplated by embodiments of the present invention.

Referring now to FIG. 3, the first step involves the removal of any initial pre-ordered lists, as indicated by a block 306. In other words, the present invention determines whether there are any initial (i.e., highest valued) sorted lists whose values do not overlap with any other of the sorted lists, and thus do not need to be merged. If this is the case, then that list(s) can be removed from the merge process. This is discussed further below.

The next step is to determine the search bounds of the sorted lists which were read into common memory 104. This is indicated by a block 316. What this means is that the bounds from which tasks will be created are set. Thus, all of the P records which are loaded into common memory 104 are not necessarily going to be part of the portion from which tasks are created. This is to account for the fact that all of the records in the sorted lists might not all fit into common memory 104 at once. This is discussed in greater detail further below.

Once the search bounds are determined, the appropriate task size is then determined based upon the number of processors 106 and the number of initial records which are loaded into common memory 104 within the search bounds. This is indicated by a block 308. More specifically, embodiments of the present invention contemplate that the number of records is divided by the number of processors to determine the appropriate task size.

Because of the possible high degree of skew in the value of the records in the sorted lists, it may require much effort to obtain an exact task size for each task. To alleviate expending unnecessary time and effort, embodiments of the present invention contemplate allowing a range of task sizes to be used. For example, some embodiments envision that a range of plus-or-minus 10 percent of a selected task size be allowed. This results in a more efficient partitioning scheme. Once the task size has been determined, the sorted lists are partitioned into N tasks, as indicated by a block 310. These tasks are then distributed among the N processors, which concurrently sort the N tasks as indicated by a block 312.

Finally, the resultant sorted tasks are concatenated to form a single sorted list. In some embodiments of the present invention, the initial pre-ordered lists are also concatenated to the single sorted list so that the records are in descending order (that is, the pre-ordered list(s) is on the "top" of the list. In other embodiments, the initial pre-ordered list(s) is just sent to some output or storage device (before the remainder of the sorted lists).

Some of the features of the present invention described above will now be discussed in greater detail.

III. PARTITIONING SORTED LISTS INTO N TASKS

Figure 4:
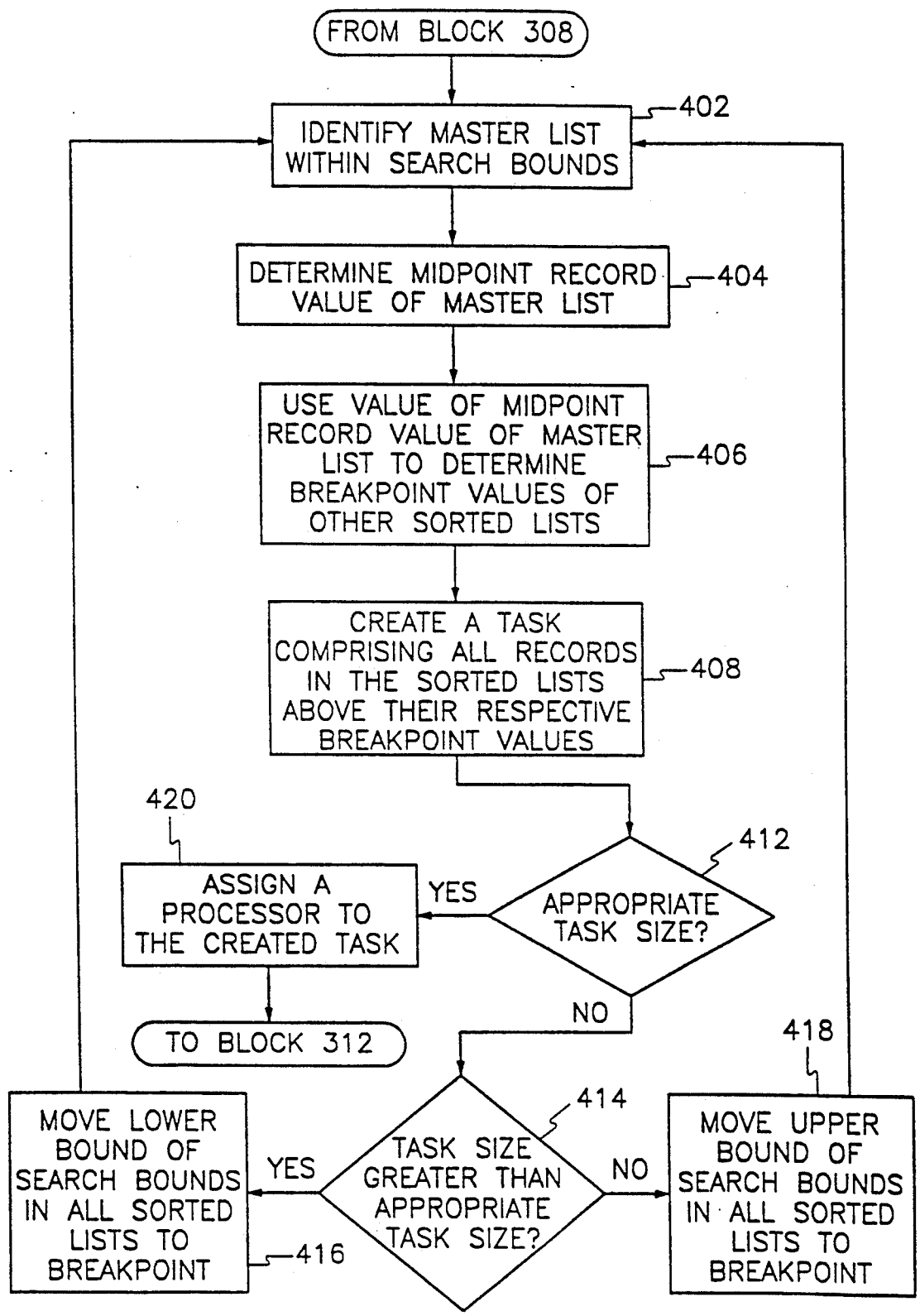
FIG. 4 is a diagram of the partitioning mechanism as contemplated by embodiments of the present invention.

The scheme for partitioning the sorted lists into N tasks as contemplated by embodiments of the present invention can be best described with regard to FIG. 4. Referring now to FIG. 4, the first step is to identify the "master" list within the search bounds (which were set as per block 316 of FIG. 3) as indicated by a block 402. It is contemplated that the "master" list is that list which contains the most records.

Once the master list is identified, then the midpoint record value of the master list is determined. This is indicated by a block 404. It should be emphasized, though, that this midpoint is the midpoint of the master list in light of the search bounds.

The next step is to use the value of the above-determined midpoint record of the master list to determine where in the other sorted lists a record of equal or greater value exists. These values of the records of equal or greater value than the midpoint record are termed "breakpoint values." This is indicated by a block 406. Embodiments of the present invention contemplate that the breakpoint values for the sorted list are determined using a binary search method, and each of these binary searches are done using a separate processor. For a more detailed explanation of binary searches, see Knuth, "The Art Of Computer Programming," Volume 3, "Searching and Sorting," (Addison-Wesley; Reading, Mass., 1973) which is incorporated by reference herein.

Once all of the breakpoint values (or next greater value) of all the sorted lists have been determined, a task comprising the records within the sorted lists having values greater than (or equal to) their respective breakpoint values and within the search bounds is created. This is indicated by a block 408. Once created, it must be determined whether this task is of the appropriate size, as indicated by a decision block 412. The determination of appropriate size was discussed above with regard to block 308 in FIG. 3.

If a task is of appropriate size, then a processor is assigned to sort the records in the task, as indicated by a block 420. The task is then sorted, as indicated by block 312 of FIG. 3.

If the task is not of the appropriate size, then it must be determined whether the task size is greater or less than the appropriate task size. This is indicated by a decision block 414. If the task size is greater than the appropriate task size, then the lower bound of the search bounds in all of the sorted lists is moved to the breakpoint, as indicated by a block 416. Thus, with regard to the master list, since the breakpoint was the midpoint valued record, the lower bound for that list is moved to what had been this midpoint value. For all the other sorted lists, whatever their breakpoint value was, now becomes the lower search bounds. The sequence then begins again with the identification of a new master list, as indicated by the connection between blocks 416 and 402.

If, however, the task size is less than the appropriate task size, then the upper bound of the search bounds in all the sorted lists are moved to what was their former breakpoints, as indicated by a block 418. Once this is done, again the sequence begins anew with block 402.

It should be kept in mind that the search bounds discussed above only pertain to the identification of a breakpoint. The task itself always comprises those data records from the final breakpoint to the top (i.e. to the highest-valued records) of the sorted lists for which a task has not yet been created. It should also be noted that embodiments of the present invention contemplate that the search bounds are adjusted by using a binary search. Of course, the present invention also contemplates other schemes for adjusting the breakpoint values.

Figure 8:
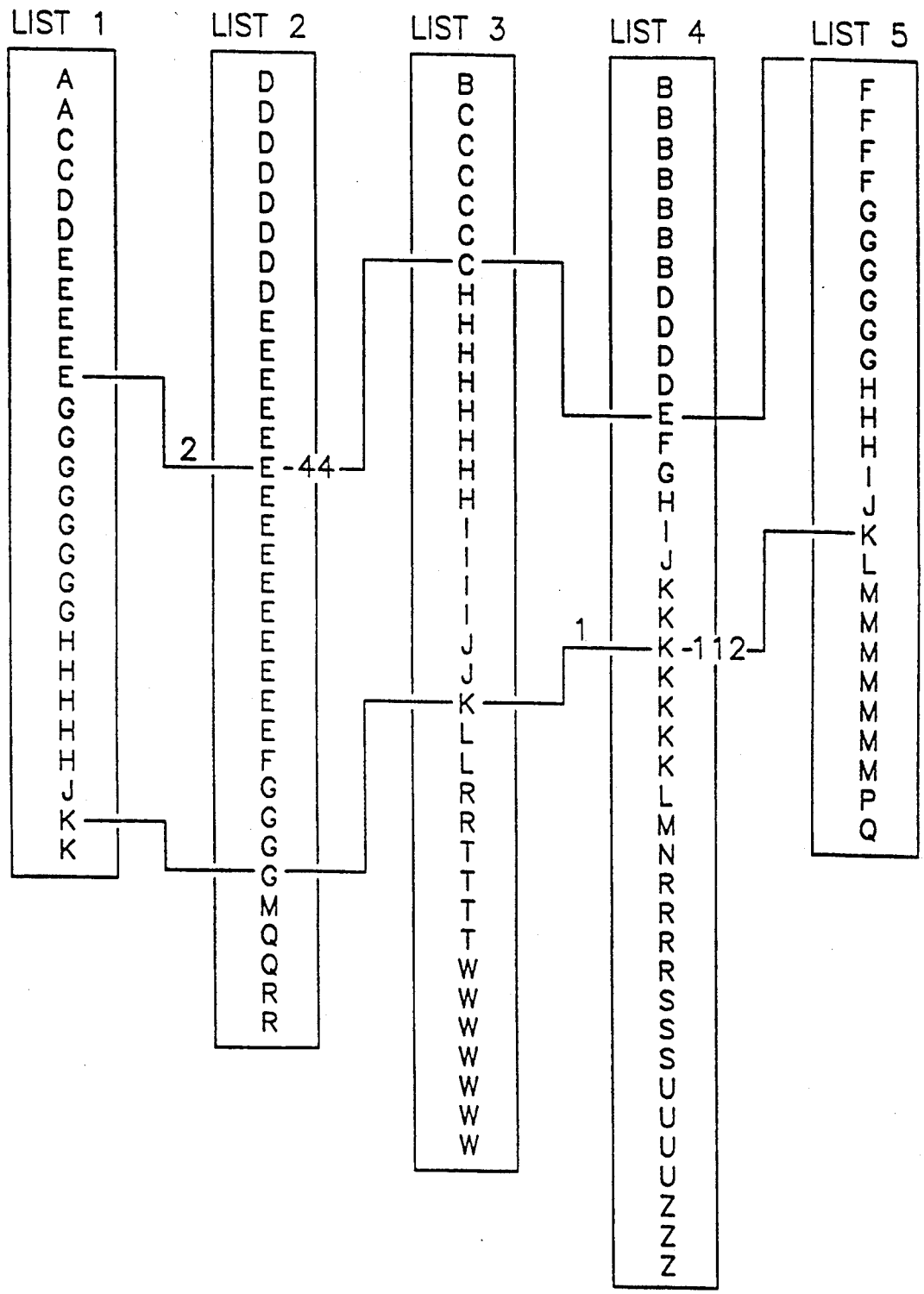
FIG. 8 is an example used to illustrate various features of the present invention.

An example of the scheme described with regard to FIG. 4 can be seen from FIG. 8. Referring now to FIG. 8, 164 records are shown in five sorted lists labelled List 1 through List 5. Four processors are assumed to be in use. Since there are 164 records and four processors, the exact "appropriate" task size would be 164 divided by 4, or 41. This examples assumes that a 10 percent range is acceptable, which means that a range of between 37 and 45 records would be an appropriate task size.

In this example, the master list would be identified as List 4. The midpoint record value of List 4 is shown to be one of the "K" values. After the midpoint record value has been determined, the breakpoint values of all of the other sorted lists are determined based upon this midpoint value. Thus, the breakpoint of the other lists will be at value "K" or above. In the case of List 2, where there is no "K" value, the next value above "K" (in this case "G") is used as the breakpoint.

A task is then created which consists of all of the records above or equal to this breakpoint. (Embodiments also contemplate that the task consists of records only above the breakpoint.) In this example, the breakpoint Line as discussed above is shown by "line 1," and that 112 records are in the task. In this particular example, 112 records is not an appropriate task size, since it is not within the range of 37 to 45 records. Thus, decision block 412 would be "no." Further, since 112 records is greater than the appropriate task size, block 416 would come into effect via decision block 414. This causes the former breakpoint ("line 1") to now become the lower search bounds.

The process then begins anew, with the identification of the master list within the search bounds. In this example, the master list would now be List 2, since it contains the most records between the top of the sorted lists and this new lower search bounds. A new breakpoint is determined at value "E," and the new breakpoints are then determined for all of the sorted lists. This new breakpoint is indicated by "line 2" (having 44 records). Since the task which comprises all of the data records above line 2 are within the appropriate range, these data records are assigned to a processor in accordance with block 420, and the sorted lists are merged together.

It should be emphasized that the example shown in FIG. 8 is only an example, and that any number of sorted lists having any number and type of records are also contemplated.

IV. DETERMINATION OF SEARCH BOUNDS

Figure 5:
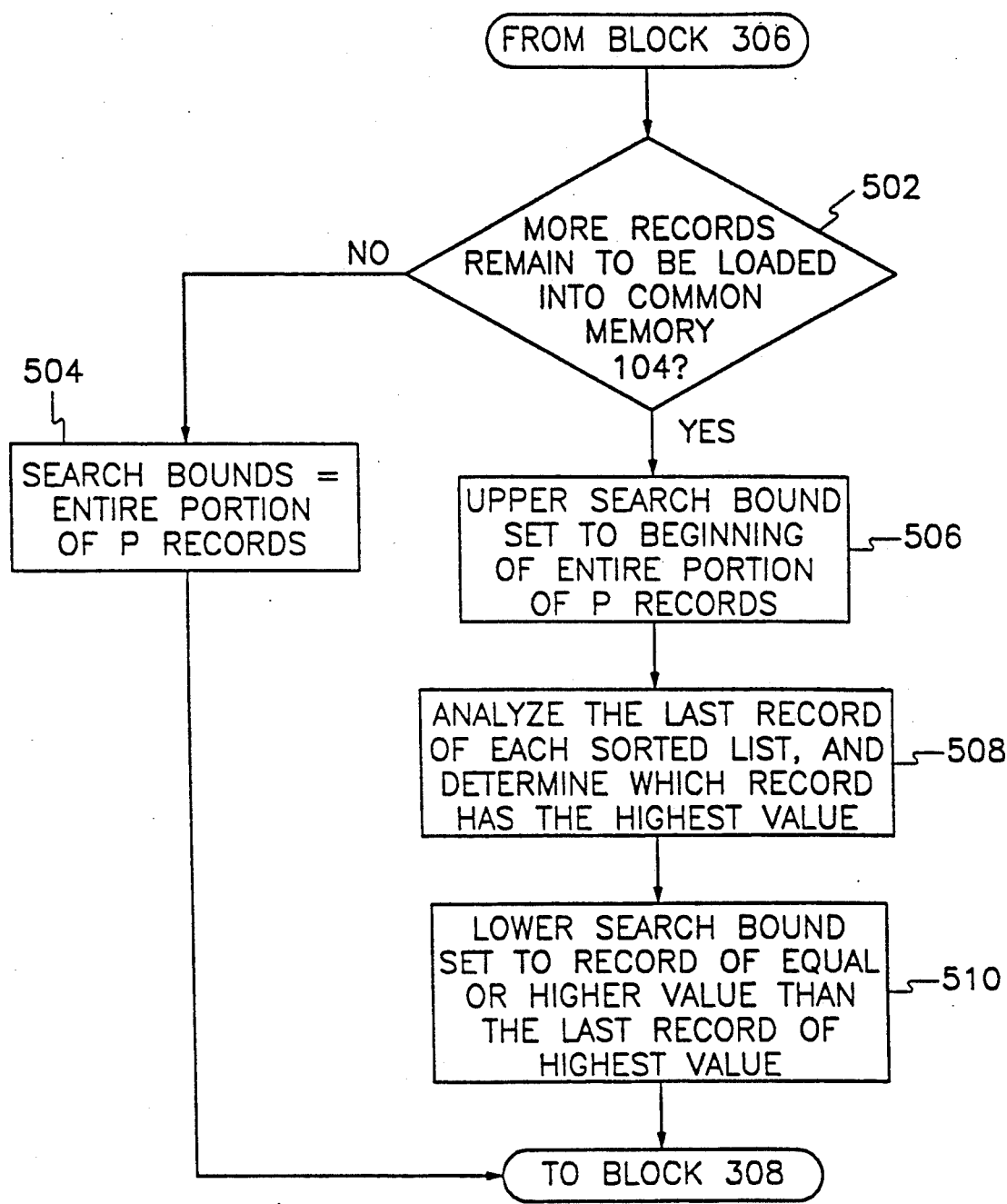
FIG. 5 is a diagram of the mechanism for determining the search bounds as contemplated by embodiments of the present invention.

A more detailed description of the way in which the search bounds are set prior to partitioning the sorted lists into N tasks is described with regard to FIG. 5. In general, the scheme contemplated by embodiments of the present invention for determining these search bounds takes into account the situation where all of the records in the sorted lists are too numerous to fit into common memory 104 at once. Thus, this scheme contemplates that as many records of the sorted lists as possible in accordance with blocks 202 and 205 of FIG. 2 (i.e., P or less records), have been loaded into common memory 104.

Referring now to FIG. 5, in determining these search bounds for the sorted lists loaded into common memory 104, a determination is made as to whether there are any more records that remain to be loaded into common memory 104 from the storage device 102. This is indicated by a decision block 502. If there are no more records left, then the search bounds are set to the entire portion of all the P records of all the sorted lists. This is indicated by a block 504.

If, however, more records remain to be loaded into common memory 104, then the upper search bound is set to the beginning of the entire portion of the P records (that is, to the top of each of the sorted lists) as indicated by a block 506. The last record of each of the sorted lists is then analyzed and a determination is made as to which of these "last" records has the highest value. This is indicated by a block 508.

The lower search bound is then set to a record of equal or higher value than this last record of highest value for each of the sorted lists, as indicated by a block 510. In other words, if the highest of the record values is a "G", then for each of the other sorted lists, the lower bound will be set to either a "G" or the record of next highest value (if there is no "G"). The reason this is done is that it may otherwise be the case that there may be some records still remaining on the storage device 102 which should have been merged with some of these lists. This is because when the P records are loaded into the common memory 104, the sorted list having the last record with the highest value may have records still on the storage device 102 which are of lower value than some of the records on the other sorted lists which have been loaded into common memory 104. The scheme described above alleviates this problem.

V. TASK SORT

Figure 6:
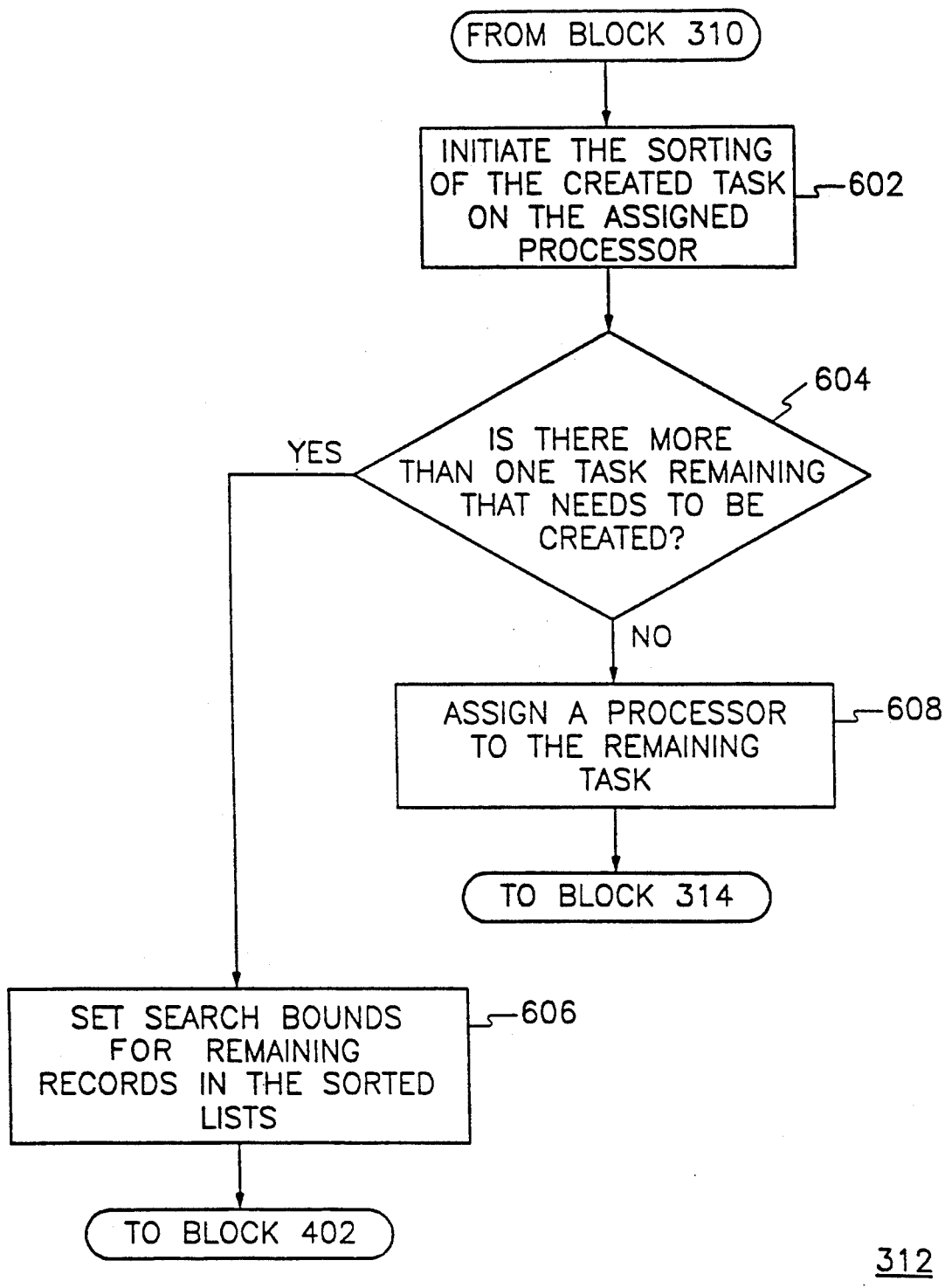
FIG. 6 is a diagram of the sorting mechanism as contemplated by embodiments of the present invention.

The scheme contemplated by embodiments of the present invention for sorting N tasks on N processors as indicated by block 312 of FIG. 3 is now described in greater detail with regard to FIG. 6. As contemplated by embodiments of the present invention, the sort process occurs for each of the N processors subsequent to the creation of each of the N tasks as per block 310 of FIG. 3. Referring now to FIG. 6, the first step is to initiate the sorting of the created task on the assigned processor, as indicated by a block 602. Thus, as soon as a task is created and assigned a processor, the sorting process is subsequently initiated. A determination is then made as to whether there are any more tasks that need to be created from the portion of the sorted lists within the bounds defined by block 316 of FIG. 3. This is indicated by a decision block 604.

If there are more tasks remaining (that is, there are more records in the common memory 104 which have not been partitioned into a task), then the search bounds are set to include all of the remaining records in the sorted lists, as indicated by a block 606. Embodiments of the present invention then contemplate that control will then be returned to block 402 of FIG. 4, so that the next task can be created.

If, however, there is only one task remaining that needs to be created, a processor is simply assigned to that remaining task for sorting. This is indicated by a block 608. The task is sorted, and control then goes to block 314 of FIG. 3.

VI. REMOVAL OF INITIAL PRE-ORDERED LISTS

As indicated above, the present invention determines if there are any pre-ordered sorted lists amongst the sorted lists loaded into common memory 104. A more detailed description of how this determination is made is discussed with regard to FIG. 7.

Figure 7:
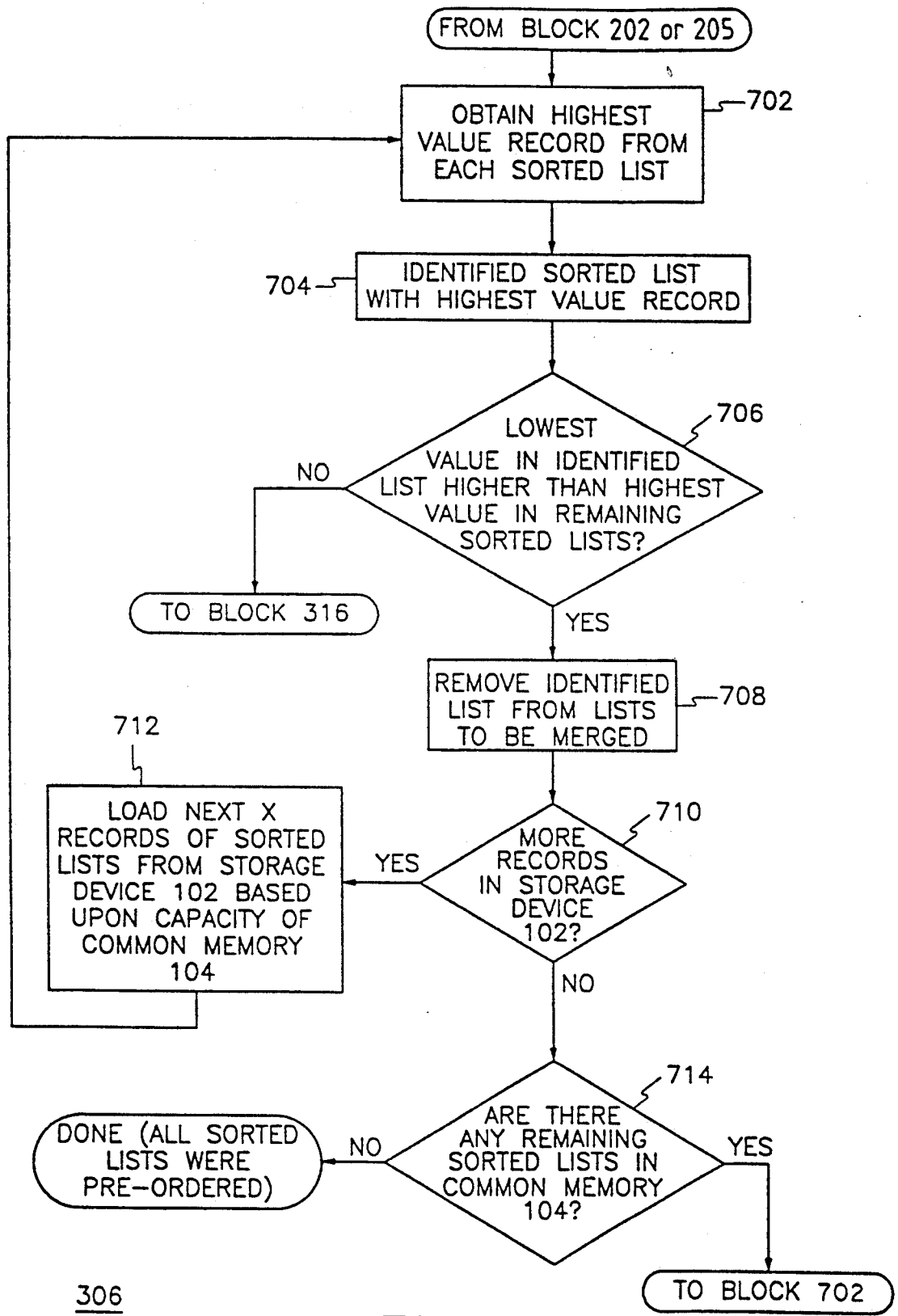
FIG. 7 is a diagram of the mechanism for removing initial pre-ordered lists as contemplated by embodiments of the present invention.

Referring now to FIG. 7, the highest value record from each of the sorted lists is obtained, as indicated by a block 702. Thus, a determination is made as to which of the sorted lists contains the record with the highest value. This is indicated by a block 702. The sorted list containing the record with the highest value is then identified, as indicated by a block 704.

The record having the lowest value in the list which had been identified as containing the highest value is then analyzed, and a determination is made as to whether the lowest value in this list is higher in value than any other record in any of the remaining sorted lists. This is indicated by a block 706. If the answer is "no," then that means that the identified sorted list contains values which are lower than some of the values in other sorted lists. Therefore, the identified sorted list needs to be merged with the other sorted lists, and cannot be removed as a pre-ordered list. Thus, control then goes to block 316 of FIG. 3.

If, however, the record with the lowest value in the identified sorted list has a value higher than all of the other remaining sorted lists, then the identified sorted list can be removed from the lists which are to be merged. This is indicated by a block 708.

If a pre-ordered list had been found and removed, then the next step is to determine whether there are any more records in storage device 102 which have not yet been loaded into common memory 104, as indicated by a block 710. If there are, then the next X records from storage device 102 are loaded into common memory 104, where X will be equal to the number of records in the removed pre-ordered list (or the number of records remaining in the storage device which have not yet been loaded if this number is less than X), as indicated by a block 712. In this way, as soon as a pre-ordered list is removed from the common memory 104, as is done in embodiments contemplated by the present invention, additional records can immediately be loaded. This increases the efficiency of the present invention. The sequence then begins anew, as indicated by the connection between block 712 and block 702.

If there are no more records in storage device 102 to be loaded, a determination is made as to whether there are any remaining sorted lists in common memory 104. This is indicated by a decision block 714. If there are, then they need to be merged, and thus control is sent to block 316.

If there are no more remaining sorted lists in common memory 104, then at this stage this would mean that all of the sorted lists were pre-ordered. That is, all of the sorted lists in the storage device 102 had no overlapping records, and thus no merging whatsoever needed to be done. It should be noted that in checking for the possibility that pre-ordered lists exists, the present invention provides a more efficient way to create a single sorted list by not merging those sorted lists which need not be merged.

VII. HIGH-LEVEL MODULAR STRUCTURE

Figure 9:
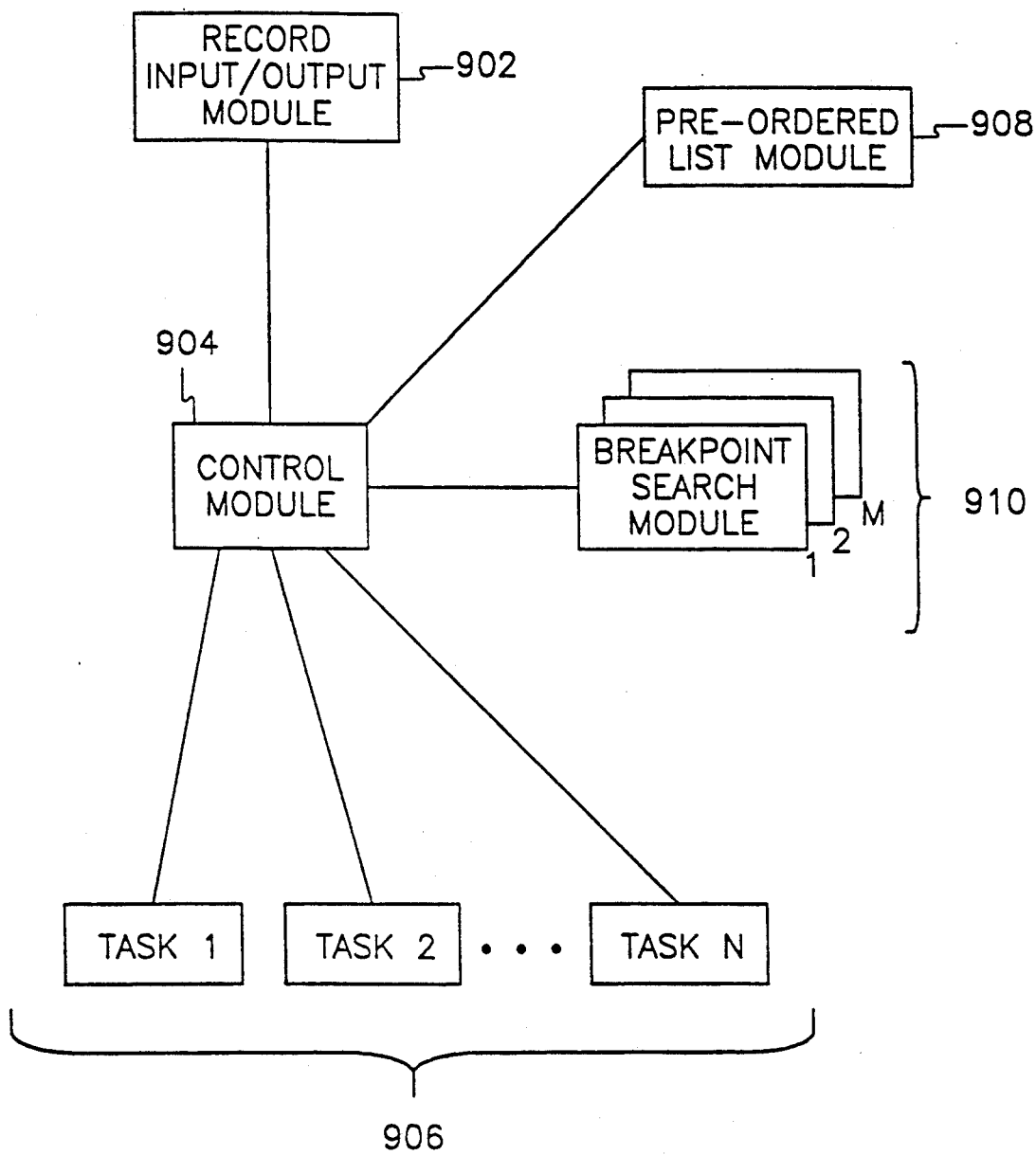
FIG. 9 is a diagram of various modules contemplated for use by embodiments of the present invention.

A high-level modular structure of embodiments contemplated by the present invention is shown with regard to FIG. 9. Referring now to FIG. 9, a record input/output module 902 is shown, which is contemplated to perform the function of loading records from the storage device 102 into common memory 104. Embodiments of the present invention also contemplate that the final sorted lists can be stored on the storage device 102, and again this would be done via the record input/output module 902.

A control module 904 is contemplated to perform most of the functions required by the present invention as described above. These include the determination of the breakpoints within a master list, and of managing facilities which invoke each of the tasks on the N processors 106. The N tasks 906 are N functions for sorting the N tasks individually and simultaneously. Thus, embodiments of the present invention contemplate that each of the N processors executes a function to sort each of the N tasks.

A breakpoint search module 910 is used to determine the breakpoints in the sorted lists (other than the master list). Embodiments of the present invention contemplate that for each of M sorted lists in a task, a different one of the processors 106 is assigned to find the breakpoint for each sorted list. As contemplated by embodiments of the present invention, this is done using re-entrant methods, where each processor uses the same software within common memory 104. Thus, breakpoint search module 910 is shown as M separate modules. Even though there are actually not M separate modules (due to the re-entrant nature of the software), it nonetheless behaves as though there are.

Finally, a pre-ordered list module 908 is used to perform the pre-ordered list removal as discussed with regard to FIG. 7.

The explanation of embodiments of the present invention discussed above described a scheme which merges N sorted lists which are assumed to be sorted in highest-to-lowest order, resulting in a single sorted list having records from highest-to-lowest record order. However, it should be understood that embodiments of the present invention contemplate the sorting of lists from lowest-to-highest order as well.

It should be understood that embodiments of the present invention can be implemented in hardware, software or a combination thereof. In such embodiments, the various components and steps would be implemented in hardware and/or software to perform the functions of the present invention. Any presently available or future developed computer software language and/or hardware components can be employed in such embodiments of the present invention. In particular, the flowchart figures discussed above can be especially useful for creating the software embodiments.

While the invention has been particularly shown and described with reference to preferred embodiments thereof, it will be understood by those skilled in the art that various changes in form and details may be made therein without departing from the spirit and scope of the invention.

What is claimed is:

1. A method of merging a plurality of original lists of sorted records using a plurality of independently operating processors and a common memory having a limited capacity, comprising the steps of:
   (1) selecting a portion of the original lists based on the limited capacity of the common memory;
   (2) storing in the common memory the records of the selected portion to form selected sorted lists;
   (3) determining whether any one of the selected sorted lists stored in the common memory is a pre-ordered sorted list and if so:
      (a) removing the pre-ordered sorted list from the common memory,
      (b) replacing the removed pre-ordered sorted list by storing in the common memory more records from the original lists to form another selected sorted list, and
      (c) repeating step (3) until all pre-ordered sorted lists have been removed from the common memory;
   (4) determining a task size based upon the number of records in the selected sorted lists stored in the common memory and the number of said processors;
   (5) dividing the selected sorted lists stored in the common memory into a plurality of independent tasks equal in number to the number of said processors such that the records of any one of the tasks are either all greater than or equal in value to each record in an other one of the tasks or all less than or equal in value to each record in the other task;
   (6) sorting the records in each task in parallel by said processors to create sorted task lists;
   (7) concatenating the sorted task lists with each other and with any removed pre-ordered sorted lists to create a single sorted list;
   (8) re-executing steps (1) through (7) for remaining records of the original lists until all records of the original lists have been sorted into single sorted lists; and
   (9) concatenating the single sorted lists to form a final sorted list.

2. The method of claim 1, wherein the dividing step (5) comprises the step of analyzing the records in the selected sorted lists stored in the common memory to ensure that each record in the tasks is greater than or equal in value to any record of the original lists remaining to be stored in the common memory by step (2).

3. The method of claim 1, wherein the dividing step (5) comprises the step of using a binary search to divide the selected sorted lists stored in the common memory into the tasks.

4. The method of claim 3, wherein the dividing step (5) further comprises the step of using the processors to divide the selected sorted lists stored in the common memory into the tasks.

5. An apparatus for merging a plurality of original lists of sorted records stored in a storage device, comprising:
   a common memory having a limited capacity;
   a plurality of independently operating processors each having access to the common memory;
   means for selecting a portion of the original lists based on the limited capacity of the common memory and for storing in the common memory the records of the selected portion to form selected sorted lists;
   pre-order detection means (a) for determining whether any one of the selected sorted lists stored in the common memory is a pre-ordered sorted list, (b) for removing the pre-ordered sorted list from the common memory, (c) for replacing the removed pre-ordered sorted list by storing in the common memory more records from the original lists to form another selected sorted list, and (d) for repeating (a), (b), and (c) until all pre-ordered sorted lists have been removed from the common memory;
   division means for dividing the selected sorted lists stored in the common memory into a plurality of independent tasks equal in number to the number of said processors such that each task has a task size based upon the number of records in the selected sorted lists stored in the common memory and the number of said processors;
   sorting means for sorting the records in each task to create sorted task lists; and
   concatenation means for concatenating the sorted task lists with each other and with any removed pre-ordered sorted lists to create a single sorted merged list and for concatenating the single sorted merged list with other single sorted merged lists generated from selected portions of the original lists to form a final sorted list.

6. The apparatus of claim 5, further comprising:
   means for setting an upper bound and a lower bound of the selected sorted lists stored in the common memory, said setting means including means for analyzing the lowest valued record in each of the selected sorted lists stored in the common memory to determine which of these lowest valued records has the highest value and for setting the lower bound to the highest value; and wherein
   said division means divides the selected sorted lists stored in the common memory into the tasks based on the set upper and lower bounds.

7. The apparatus of claim 5, wherein said division means uses a binary search to divide the selected sorted lists stored in the common memory into the tasks.

8. The apparatus of claim 5, wherein said processors form part of a multi-processing parallel machine.

9. The apparatus of claim 5, wherein said division means includes breakpoint means for determining a respective breakpoint value in each of the selected sorted lists stored in the common memory and for creating a task using the records from each of the selected sorted lists stored in the common memory which have a value greater than the respective breakpoint value; and wherein said division means further includes assigning means for determining whether the created task can be assigned to one of said processors based on a task size of the created task.

10. The apparatus of claim 9, wherein said processors determine in parallel the respective breakpoint value in each of the selected sorted lists stored in the common memory.

11. The apparatus of claim 9, wherein said assigning means comprises means for adjusting search bounds of the selected sorted lists stored in the common memory when said assigning means determines the created task cannot be assigned to one of said processors because of the task size of the created task; and wherein said division means creates a new task which is closer in size to a task which can be assigned to one of said processors from the selected sorted lists stored in the common memory and based on the adjusted search bounds.

* * * * *